(12) United States Patent
Tindall et al.

(10) Patent No.: US 9,600,422 B2
(45) Date of Patent: Mar. 21, 2017

(54) MONITORING ACCESSES TO MEMORY IN A MULTIPROCESSOR SYSTEM

(71) Applicant: u-blox AG, Thalwil (CH)

(72) Inventors: Paul Tindall, Bedford (GB); Erkut Uygun, Cambridge (GB)

(73) Assignee: u-blox AG, Thalwil (CH)

( * ) Notice: Subject to any disclaimer, the term of this patent is extended or adjusted under 35 U.S.C. 154(b) by 415 days.

(21) Appl. No.: 13/691,630

(22) Filed: Nov. 30, 2012

(65) Prior Publication Data

US 2013/0262806 A1    Oct. 3, 2013

(30) Foreign Application Priority Data

Mar. 30, 2012 (GB) ................... 1205737.8

(51) Int. Cl.
*G06F 9/44* (2006.01)
*G06F 9/45* (2006.01)
(Continued)

(52) U.S. Cl.
CPC ........ G06F 12/1458 (2013.01); G06F 8/4442 (2013.01); G06F 9/30185 (2013.01);
(Continued)

(58) Field of Classification Search
CPC ............. G06F 11/3409; G06F 11/3466; G06F 11/3604; G06F 11/3447; G06F 8/10; G06F 8/20; G06F 8/34; G06F 8/38; G06F 8/60; G06F 9/467; G06F 9/3004; G06F 8/4442; G06F 8/451; G06F 8/456; G06F 9/5066; G06F 9/52; G06F 11/3636; G06F 11/3644; G06F 11/366; G06F 11/362; G06F 11/2028; G06F 11/10; G06F 11/3648; G06F 8/4434;
(Continued)

(56) References Cited

U.S. PATENT DOCUMENTS 4,542,455 A * 9/1985 Demeure .................. G06F 9/52
718/104
4,819,152 A * 4/1989 Deerfield ............ G06F 12/0207
711/217
(Continued)

FOREIGN PATENT DOCUMENTS

| EP | 2645258 A1 | 10/2013 |
|---|---|---|
| GB | 2450505 A | 12/2008 |
| GB | 2 482 141 A | 1/2012 |

OTHER PUBLICATIONS

Stefan Savage et al., Eraser: A Dynamic Data Race Detector for Multithreaded Programs, 1997 ACM, [Retrieved on Aug. 31, 2016]. Retrieved from the internet: <URL: http://dl.acm.org/citation.cfm?id=265927> 21 Pages (391-411).*
(Continued)

*Primary Examiner* — Tuan Q. Dam
*Assistant Examiner* — Anibal Rivera
(74) *Attorney, Agent, or Firm* — Blakely, Sokoloff, Taylor & Zafman LLP

(57) ABSTRACT

Embodiments of the present invention provide methods and apparatus in a multiprocessor system, whereby a set of rules relating to memory access are created and implemented in a hardware element. The rules can be updated dynamically, for example by the sequence processor (or sequencer) used to control the multiple processing elements.

15 Claims, 2 Drawing Sheets

(51) Int. Cl.
  *G06F 12/14* (2006.01)
  *G06F 9/30* (2006.01)
  *G06F 11/36* (2006.01)
  G06F 11/34 (2006.01)
  G06F 9/455 (2006.01)

(52) U.S. Cl.
  CPC ...... *G06F 11/3409* (2013.01); *G06F 11/3636* (2013.01); *G06F 9/45504* (2013.01); *G06F 11/3471* (2013.01)

(58) Field of Classification Search
  CPC .. G06F 9/30032; G06F 9/524; G06F 12/0804; G06F 11/3471; G06F 11/1407; G06F 11/1438; G06F 11/3668; G06F 11/3457; G06F 11/3632; G06F 11/3684; G06F 9/45504; G06F 9/3017; G06F 9/4552; G06F 9/262; G06F 9/30181; G06F 9/30185; G06F 9/44589; G06F 9/526; G06F 8/442; G06F 8/443; G06F 8/70; G06F 8/445; G06F 8/434; G06F 8/447
  See application file for complete search history.

(56) References Cited

U.S. PATENT DOCUMENTS

| | | | | |
|---|---|---|---|---|
| 5,045,993 | A * | 9/1991 | Murakami | G06F 7/575 711/149 |
| 5,206,940 | A * | 4/1993 | Murakami | G06F 7/575 711/200 |
| 5,222,241 | A * | 6/1993 | Murakami | G06F 7/575 712/228 |
| 5,237,667 | A * | 8/1993 | Murakami | G06F 7/575 712/248 |
| 5,247,627 | A * | 9/1993 | Murakami | G06F 7/575 712/236 |
| 5,778,446 | A * | 7/1998 | Kim | G06F 13/1689 711/105 |
| 5,784,636 | A * | 7/1998 | Rupp | G06F 15/7867 712/200 |
| 6,128,720 | A * | 10/2000 | Pechanek | G06F 9/30185 712/15 |
| 6,272,612 | B1 | 8/2001 | Bordaz et al. | |
| 6,374,286 | B1 * | 4/2002 | Gee | G06F 9/262 710/260 |
| 6,769,116 | B1 * | 7/2004 | Sexton | G06F 11/3644 712/227 |
| 7,047,520 | B2 * | 5/2006 | Moore | G06F 11/362 710/266 |
| 7,111,307 | B1 * | 9/2006 | Wang | G06F 11/3668 711/152 |
| 7,143,401 | B2 * | 11/2006 | Babaian | G06F 9/52 709/248 |
| 7,350,036 | B2 * | 3/2008 | Kim | G06F 9/52 711/149 |
| 7,523,261 | B2 * | 4/2009 | Haid | G06F 9/3017 711/125 |
| 7,669,189 | B1 * | 2/2010 | Umamageswaran | G06F 11/3471 711/100 |
| 7,779,307 | B1 * | 8/2010 | Favor | G06F 11/1407 714/38.1 |
| 7,823,013 | B1 * | 10/2010 | O'Krafka | G06F 12/0804 711/144 |
| 8,127,280 | B2 * | 2/2012 | Thomas | G06F 8/4442 717/136 |
| 8,370,815 | B2 * | 2/2013 | Liu | G06F 11/366 714/38.1 |
| 2001/0032305 | A1 * | 10/2001 | Barry | G06F 9/30181 712/34 |
| 2002/0002640 | A1 * | 1/2002 | Barry | G06F 13/28 710/22 |
| 2002/0019910 | A1 * | 2/2002 | Pitsianis | G06F 8/445 711/125 |
| 2003/0014602 | A1 * | 1/2003 | Shibayama | G06F 12/0815 711/156 |
| 2003/0046462 | A1 * | 3/2003 | Wolff | G06F 15/8007 710/100 |
| 2003/0140337 | A1 * | 7/2003 | Aubury | G06F 11/3409 717/158 |
| 2003/0167381 | A1 * | 9/2003 | Herscovich | G06F 13/1605 711/151 |
| 2004/0015931 | A1 * | 1/2004 | Larin | G06F 8/447 717/158 |
| 2004/0168154 | A1 * | 8/2004 | Yoneda et al. | 717/124 |
| 2006/0179228 | A1 * | 8/2006 | Thompson | G06F 9/30032 711/129 |
| 2006/0218535 | A1 * | 9/2006 | Delmonte | G06F 11/3457 717/127 |
| 2006/0288173 | A1 * | 12/2006 | Shen | G06F 12/0833 711/141 |
| 2007/0157200 | A1 * | 7/2007 | Hopkins | G06F 9/52 718/100 |
| 2007/0168989 | A1 * | 7/2007 | Edwards | G06F 11/3636 717/127 |
| 2007/0245312 | A1 * | 10/2007 | Qadeer | G06F 11/3632 717/124 |
| 2007/0250820 | A1 * | 10/2007 | Edwards | G06F 11/3636 717/131 |
| 2008/0034350 | A1 * | 2/2008 | Conti | G06F 21/54 717/124 |
| 2008/0052466 | A1 * | 2/2008 | Zulauf | G06F 12/0862 711/125 |
| 2008/0109641 | A1 * | 5/2008 | Ball | G06F 11/3684 712/216 |
| 2008/0127035 | A1 * | 5/2008 | Lev | G06F 11/362 717/100 |
| 2008/0140971 | A1 | 6/2008 | Dankel et al. | |
| 2008/0288238 | A1 * | 11/2008 | Heller, Jr. | G06F 9/45504 703/28 |
| 2008/0288834 | A1 * | 11/2008 | Manovit | G06F 11/28 714/718 |
| 2008/0301657 | A1 * | 12/2008 | Bowler | G06F 8/443 717/158 |
| 2008/0320247 | A1 * | 12/2008 | Morfey | G06F 1/24 711/154 |
| 2009/0037888 | A1 * | 2/2009 | Tatsuoka | G06F 9/524 717/135 |
| 2009/0119459 | A1 * | 5/2009 | Akkary | G06F 9/526 711/130 |
| 2009/0282304 | A1 * | 11/2009 | Piry | G06F 11/3648 714/718 |
| 2010/0070955 | A1 * | 3/2010 | Kahlon | G06F 8/434 717/141 |
| 2010/0191930 | A1 * | 7/2010 | Groff | G06F 8/44 711/170 |
| 2010/0318746 | A1 * | 12/2010 | Troxel | G06F 11/1438 711/141 |
| 2011/0067016 | A1 * | 3/2011 | Mizrachi | G06F 8/4442 717/149 |
| 2011/0231827 | A1 * | 9/2011 | Kilbane | G06F 11/362 717/129 |
| 2011/0320745 | A1 * | 12/2011 | Zhang | G06F 11/3636 711/154 |
| 2012/0011490 | A1 * | 1/2012 | Mizuno | G06F 9/4552 717/127 |
| 2012/0254551 | A1 * | 10/2012 | Kasahara | G06F 8/70 711/143 |
| 2013/0241941 | A1 * | 9/2013 | Donaldson | G06F 9/44589 345/505 |

OTHER PUBLICATIONS

Yuan Yu et al., RaceTrack: Efficient Detection of Data Race Conditions via Adaptive Tracking, 2005, [Retrieved on Aug. 31, 2016]. Retrieved from the internet: <URL: http://dl.acm.org/citation.cfm?id=1095832> 14 Pages (221-234).*
European Patent Office Search Report for European Patent Application No. 13161476; Aug. 27, 2013; 7pgs.

(56) References Cited

OTHER PUBLICATIONS

Venkataramani et al., "MemTracker: Efficient and Programmable Support for Memory Access Monitoring and Debugging," High Performance Computer Architecture; 2007. HPCA 2007; IEEE $13^{th}$ International Symposium on; IEEE; PI; XP031072915; Feb. 1, 2007; 12pgs.

UK Search Report for UK Patent Application No. GB1205737.8; Jul. 10, 2012; 4pgs.

IEEE Standard Test Access Port and Boundary-Scan Architecture; IEEE Std 1149.1-2001; Test Tech Standards Committee of the IEEE Computer Society; IEEE-SA Standards Board; The Institute of Electrical and Electronics Engineers, Inc., 3 Park Avenue, New York, NY 10016-5997; Jul. 23, 2001; 208pgs.

\* cited by examiner

MONITORING ACCESSES TO MEMORY IN A MULTIPROCESSOR SYSTEM

TECHNICAL FIELD

The present invention relates to methods and apparatus in a multiprocessor system.

BACKGROUND

A previous application by the present Applicant (GB 2482141A) has described a system and method of controlling the execution of tasks in a system with multiple processors or processing elements where computation has to meet hard real-time constraints. This described the use of application modelling, for example using Unified Modelling Language (UML), to describe the design of a wireless physical layer.

In that application an apparatus is described which consists of a sequence processor, i.e. a programmable processor with an instruction set that implements primitives of UML, which can be programmed with code that represents a sequence of operations defined in UML and generates control signals to trigger operations in the various processing elements; and where signals from the processing elements indicating task completion are further used in conjunction with control primitives to control the execution of subsequent tasks. The system also allows the use of time events generated by a system clock to be included as trigger signals so that hard real-time constraints can be applied to the system. An advantage of the apparatus and method described is that task execution in a set of multiple processors can be very effectively controlled; and furthermore that a sequence of tasks defined in UML can be automatically compiled to microcode to control the operation of the Sequence Processor.

Thus, a modelling tool generates code from the model which targets a dedicated hardware sequence processor. This hardware sequence processor ensures that tasks executing on processors (and indeed tasks/functions running on dedicated hardware blocks) meet their deadlines and their control and data dependencies.

In a multiprocessor system, access to memory is complex because many processing elements can access the memory at various times. If the memory is also frequently recycled (to minimise size), the debugging and verification of the system is extremely difficult.

In addition, in a modern able to support multiple air interface modes such as is needed in future cellular handsets where modes may be defined in software loaded and updated in the field, there may be unexpected interactions in the way the software accesses memory which will cause operational failures from which the system must recover automatically.

Thus it is desirable to have a system that can identify and manage problems in the access of memory in a multiprocessor system, either during the development/debug phase or in normal operation.

SUMMARY OF INVENTION

According to a first aspect of the present invention, there is provided a method of monitoring memory accesses in a multiprocessor system, as set out in the claims appended hereto.

According to further aspects of the present invention, a hardware element (also referred to as a memory watch unit) is disclosed, configured to execute the method according to the first aspect, and a multiprocessor system, comprising such a hardware element; a plurality of processing elements; memory to which each of the processing elements has access; and a sequencer adapted to generate a sequence of code to be executed by the plurality of processing elements.

BRIEF DESCRIPTION OF THE DRAWINGS

For a better understanding of the present invention, and to show more clearly how it may be carried into effect, reference will now be made, by way of example, to the following drawings, in which.

DETAILED DESCRIPTION

Figure 1:
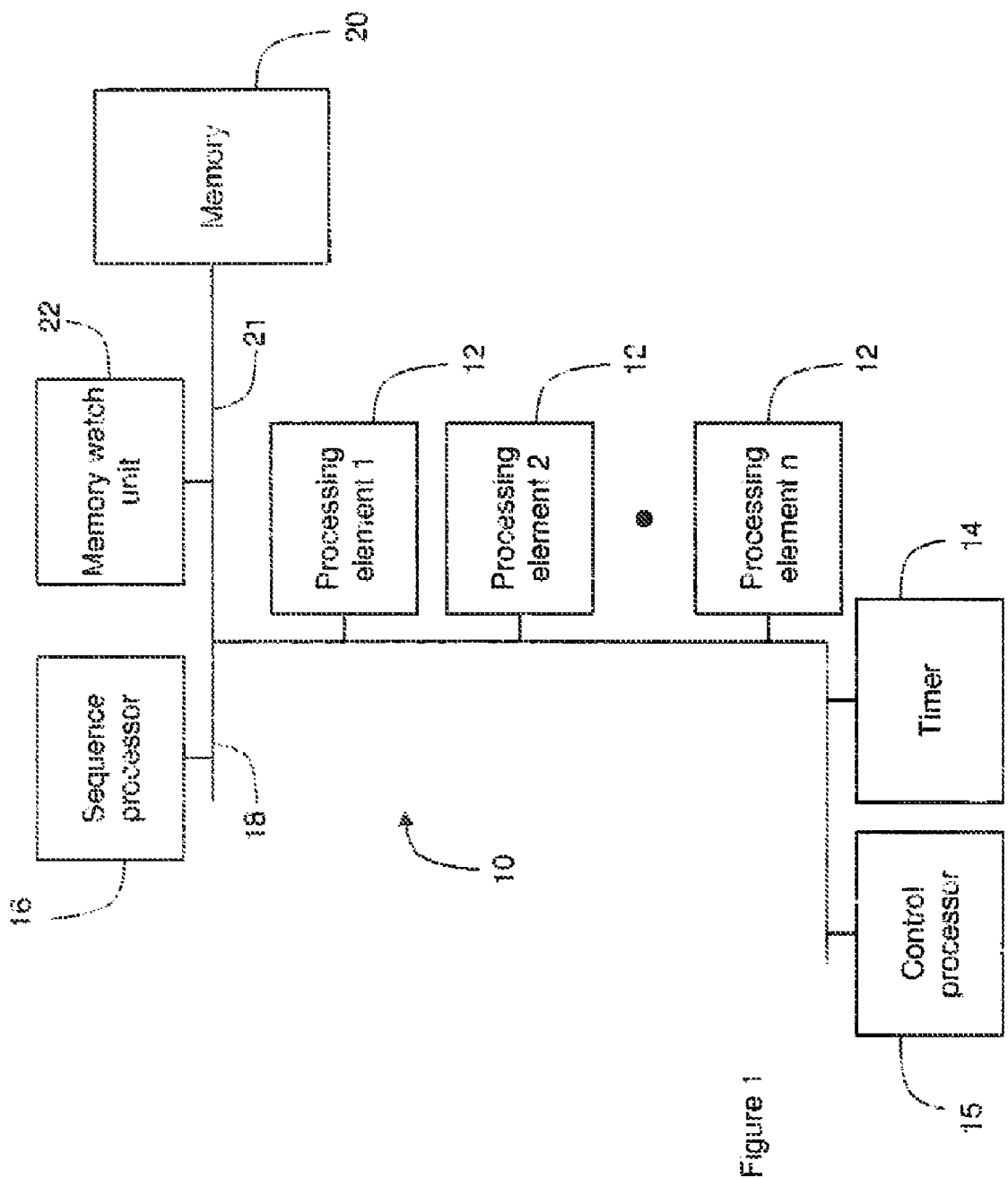
FIG. 1 is a schematic diagram of a multiprocessor system according to embodiments of the present invention.

FIG. 1 is a schematic diagram of a multiprocessor system 10 according to embodiments of the present invention.

The system 10 comprises a plurality of processing elements 1-n 12, where n is a positive integer greater than one. The illustrated embodiment shows three processing elements 12, but the system 10 could comprise as few as two processing elements.

The processing elements 12 may include any processor or specialized processor. For example, the plurality of processing elements 12 may include one or more of each of the following: vector signal processors, which may be capable of executing matrix-vector arithmetic operations on every element of a data array in the same processor cycle; hardware blocks dedicated to a single type of operation such as direct memory access or turbo-decoding; a central processing unit (CPU); or one of many other types of processing block.

The system 10 further comprises a timer 14 providing a system clock, a control processor 15 and a sequence processor 16. The processing elements 12, timer 14, control processor 15 and sequence processor 16 are all interconnected via a system bus, or interconnect 18.

The sequence processor 16 is a programmable processor with an instruction set that implements primitives of UML. The sequence processor 16 can be programmed with code that represents a sequence of operations defined in UML and generates signals (also called Action Invocations) to trigger operations in the various processing elements 12. Signals (also called Action Indications) from the processing elements indicating task completion are further used in conjunction with control primitives to control the execution of subsequent tasks. Thus a sequence of tasks defined in UML can be automatically compiled to microcode to control the operation of the sequence processor 16, which generates Action Invocations (AIs) to trigger operations in the processing elements 12.

Each AI is a message including some or all of the following; a definition of the resources required to execute the Action, including the type of processing element required, any memory requirements and/or any power or current requirements; an indication of whether the required processing element can be pre-empted; pointers to the code (if required) to program the processing element; pointers to the input data and output data buffers; data on the smallest and largest number of execution cycles required to carry out the Action if data dependent; a definition of the priority of the Action: a definition of any earliest start or latest finish times (i.e. the Action must not be started before a certain time, or must be completed by a certain time); and a definition of the position in the sequence of operations to which control should be handed back on completion of the Action.

Memory 20 is provided to which each of the processing elements 12 and the sequence processor 16 has access. The memory 20 may be on-chip, off-chip, or a combination of the two. The memory 20 may be provided in a single bank, but more commonly it is expected that the memory will comprise a plurality of banks arranged at different locations around the system 10. The memory 20 may be connected to the other elements of the system 10 via a memory bus 21 or a plurality of busses, such as a memory address bus, a memory data bus and/or one or more control lines.

According to embodiments of the present invention, the system further comprises a memory watch unit 22. The memory watch unit 22 is a dedicated hardware element, coupled to the same interconnect or bus 21 as the memory 20. This may be a dedicated memory bus, as in the illustrated embodiment of FIG. 1, or a more general system interconnect 18. The memory watch unit 22 can thus monitor each memory access made by the processing units 12 and/or the schedule processor 16. Further details of the operation of the memory watch unit 22 are provided below.

Figure 2:
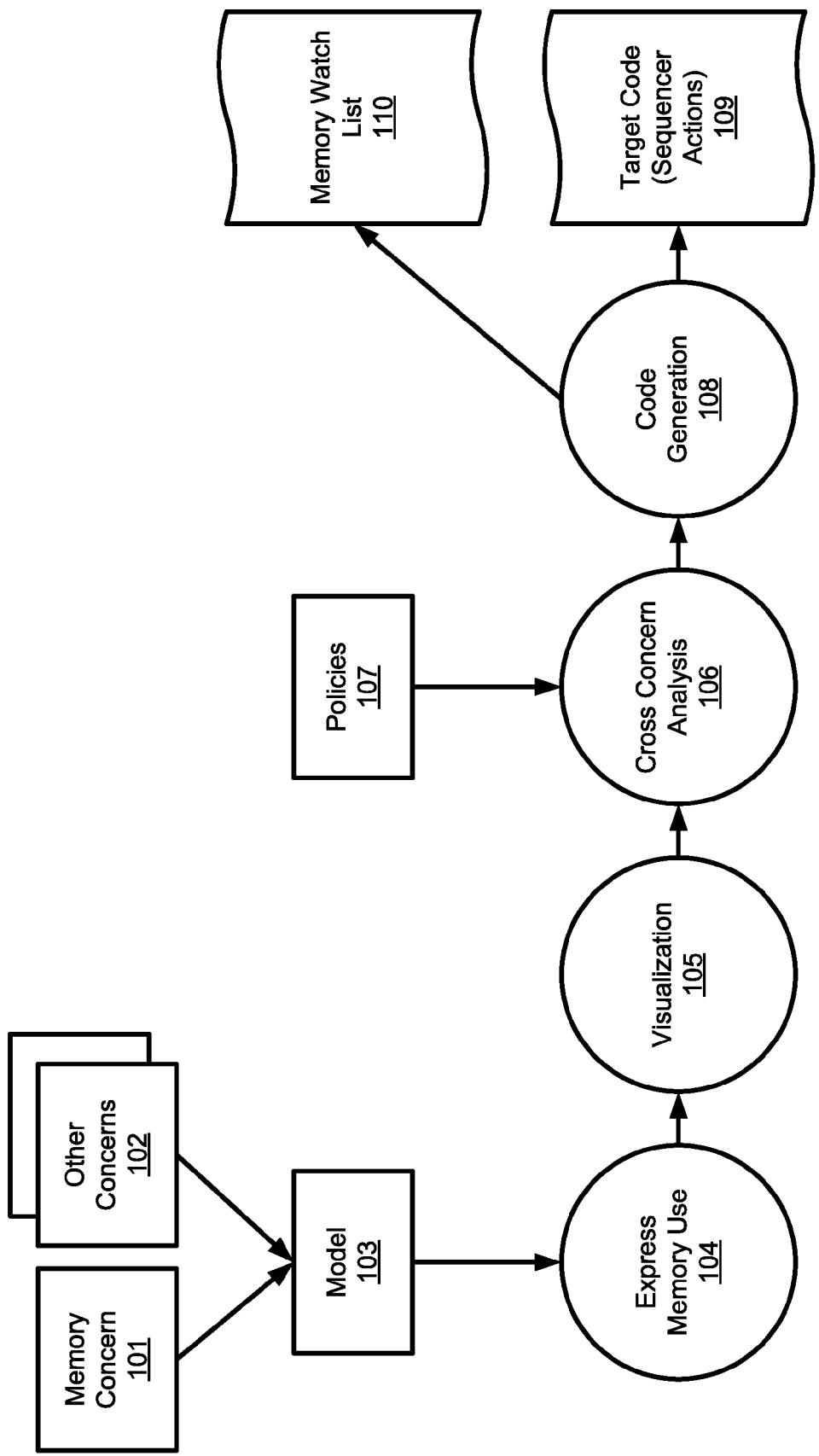
FIG. 2 is a schematic diagram of a process flow in generating code for the system shown in FIG. 1.

FIG. 2 is a schematic diagram showing a technique whereby a model of a multiprocessor system, such as the multiprocessor system 10 described above, is created during the design process. One specific example of such a system is a software instantiation of a modem Physical Layer, as described in GB 2482141A. This model allows various design concerns (e.g. power, performance, area etc) to be expressed and visualised, and allows analysis of this model to take place before code for controlling the multiprocessor system is generated. These design concerns (and others) are not isolated from each other, but it is useful to separate them when they are being expressed and visualised, not least to reduce complexity for the designer. During the analysis phase of the process, concerns can be cross-coupled and analysed together. At this stage a policy can be defined so that the code generation phase can be influenced.

Concerns or constraints on memory 101 or other characteristics 102 are expressed in a model 103 (which may be expressed using UML or any other suitable modelling language). As described in GB 2482141A, the primary purpose of the model 103 is to express dependencies between tasks to be executed by the multiple processing elements of the system.

Using the behaviour described in the model the memory usage is generated 104. Memory usage may be modelled by creating buffers in the model and attaching them to tasks running on processors, so as to create a control and data flow. The model may be further annotated to describe attributes of the memory—such as where the memory might be allocated from in the system, its alignment type etc. It may also be possible to annotate the buffers to describe their expected lifetimes, allowing the memory to be recycled for other uses as the execution of the code proceeds. The model thus has knowledge of all the critical aspects: the memory allocation, memory addresses, data flow (i.e. which process is accessing what and when) and memory lifetimes.

The memory usage may be displayed through a visualisation tool 105: a visual aid to present to the designer how the memory is laid out when used.

Policies 107 can be applied to allow "cross-concerns" about interactions between different aspects to be analysed 106 and the system optimised. The policy may be for example to limit accesses to one memory bank as far as possible so that other banks can be switched off, i.e. the policy in this example prioritises the saving of power. In this case, development tools can deduce that one memory subsystem is not used, and then code can be generated to turn it off. In another example, a policy might prioritize access speed, and generate code to use on-chip memory in preference to off-chip memory. In a still further example, a policy might prioritise performance, whereby memory allocations are spread across several memory subsystems, so that multiple processing elements can access the memory subsystem in parallel. However, the present invention is not limited to any particular policy.

Code is then generated 108 for the various processors in the system, on the basis of the analysis carried out in step 106. During the code generation phase, memory may be allocated statically. i.e. managed such that allocations are made at design time; dynamically, where code is generated to access a memory allocation API (provided by the target's operating system); or a combination of both static and dynamic allocation. In one embodiment, the control processor 15 communicates with the operating system and thus the memory allocation API; however, in other embodiments any of the processing elements 12 may communicate directly with the memory allocation API.

The generated code includes target code 109 for the sequence processor 16 and a memory watch list 110. The target code comprises a program or list of actions to be carried out by the plurality of processing elements under the control of the sequence processor 16.

Once the code for the sequence processor 16 and other system elements is generated and running, it may be that unexpected behaviour arises where given areas of memory 20 are allocated to different and unrelated processes. This may be because of programmer errors, or because the sequence processor 16 is running code from unrelated and possibly asynchronous protocols. Such behaviour can be very difficult to track, especially if it arises not in the development phase but subsequently when a product is deployed in the field.

The sequence processor 16 is thus provided with a program or list of Actions which are generated in the flow outlined in FIG. 2, and from which the action invocations described above can be generated to be sent to the processing elements 12. Also generated via the flow of FIG. 2 is a memory watch list 110 which comprises a set of memory addresses, memory data contents and memory control signals (for example read or write signals) at various points in the system operation. This memory watch list is used by the sequence processor 16 to program the memory watch unit 22 with one or more rules regarding access to the memory 20.

Thus, the sequence processor 16 provides a plurality of signals to program the memory watch unit 22 dynamically, as the execution of the program progresses. For example, new rules may be specified or old rules changed upon completion of tasks by the processing elements. These signals may comprise memory addresses, memory location data contents and memory control signals which are expected to occur, or which should not occur, at various points during execution of the sequence of code controlling the processing, elements 12.

The memory watch unit 22 is connected to the memory 20 via a bus 21 (which may be a multiplicity of busses and/or indeed other interconnects), and is thereby able to detect memory accesses made by the processing elements, and to apply the rules specified in the memory watch list 110. If one or more of the rules are violated, a warning signal may be generated as will be described below.

For example, it may be programmed to apply a rule restricting access to one or a group of memory addresses. Thus, the memory watch unit 22 may detect the address specified in a memory access, and flag that memory access as violating the rule if the address matches one of a list of restricted addresses. Access to any address of a group of addresses may be detected by analysing only one or more of the most significant bits of the address. Further, the addresses may be restricted only for access by certain types of processing elements. Thus, if the memory access originates from a first type of processing element, for which access to the address is allowed, the memory access may be granted; if the memory access originates from a second type of processing element, for which access to the address is prohibited, the memory access may be deemed to violate the rule.

In another embodiment, a rule may be applied whereby memory accesses to a certain address are restricted if they are of a certain type. For example, memory control lines can signify if an access is a read or a write operation. Certain addresses may be designated as read only, and thus any write operation to those addresses can be deemed to violate the memory access rule.

In a further embodiment, the memory watch unit 22 may implement a rule by monitoring the data in a specified memory location in any memory access. For example, a rule may specify that the data at a particular memory address takes a particular value. This value may be a control value required for the system to function correctly, or an arbitrary value used to test whether the system is functioning correctly (a technique which guards against rogue programs overwriting memory). If a memory access writes a different value to the memory address, or reads a different value from the memory address, the rule may be deemed to have been violated.

In order to implement these rules, the memory watch unit 22 may comprise a plurality of comparators for comparing the data, address, originating processing element and/or memory access type to values of those parameters which would violate the rules specified in the memory watch list 110. The memory watch unit 22 may contain one or more banks of comparators which can be logically combined to give complex triggering.

If the memory watch unit 22 finds that a memory access has violated one of the rules (e.g. a comparator detects a memory access which matches a restricted access), it may generate a warning signal (also called a memory violation trigger) which can be used in the system 10 in various ways.

For example, the warning signal may be applied to a breakpoint module which will "break" software execution and output trace data to an external system during a system "de-bug" phase, to enable the programmer to find a problem. In further embodiments, the warning signal may also be routed to an interrupt controller to generate a system interrupt (which may be routed to a control processor) and/or the sequence processor 16 to trigger exception handling routines to deal with memory violations in a controlled way.

According to embodiments of the present invention, the memory watch unit 22 may be implemented in pre-existing trace modules provided for the purpose of debugging during development. That is, in many embedded systems, for example those which are based on processor and bus technology from ARM Limited, there is often an IP block called a Trace Module. In the ARM technology this might be the "System Trace Module" (STM) or "Extended Trace Module" (ETM). These IP blocks typically contain a set of comparators which can be programmed by an external debugger, to match a set of conditions and then cause a system breakpoint (i.e. halt software execution allowing the programmer to inspect trace data leading up to the breakpoint). Normally the Trace Module is programmed from an external debug system via a JTAG port conforming to the IEEE 1149.1 Standard Test Access Port and Boundary-Scan Architecture. An important aspect of modern embedded system design is that such trace hardware is incorporated as a matter of course, whilst power consumption can be minimised by turning it off under programmed control. That is, the trace hardware is enabled through signals on the JTAG port and communicates the trace information through this port to an attached monitor system such as the ARM D-Stream JTAG interface module and DS5 trace and debug software. Once development is complete, the hardware is turned off.

According to embodiments of the present invention, this pre-existing trace circuitry can be adapted so as to be accessible by the system 10 itself, internally. For example, the inputs and outputs of the trace circuitry can be directed to the system interconnect 18, so as to make the circuitry accessible to the sequence processor 16, perhaps in addition to the JTAG port through which it is normally used. In this way, the trace circuitry can be programmed by the sequence processor 16 or any other hardware element adapted to implement the rules set out in the memory watch list 110. The trace circuitry can thus be adapted to perform the functions required of the memory watch unit 22, and the functionality of present invention may be provided with essentially no increase in the amount of hardware required in the system 10.

Embodiments of the present invention thus provide methods and apparatus in a multiprocessor system, whereby a set of rules relating to memory access are created and implemented in a hardware element. The rules can be updated dynamically, for example by the sequence processor (or sequencer) used to control the multiple processing elements, following completion of tasks performed by those processing elements.

Those skilled in the art will appreciate that various amendments and alterations can be made to the embodiments described above without departing from the scope of the invention as defined in the claims appended hereto.

What is claimed is:

1. A method in a multiprocessor system, the method comprising:
receiving a plurality of signals during execution of a sequence of code, the plurality of signals indicating a plurality of memory access rules to be applied at instances during further execution of the sequence of code, wherein the multiprocessor system includes a plurality of processing elements, a sequencer, and memory to which each of the processing elements and the sequencer has access, wherein the sequencer is a sequence processor adapted to generate the sequence of code to be executed by the plurality of processing elements, wherein the sequencer is distinct from the plurality of processing elements, and wherein the generated sequence of code includes actions to be performed by the plurality of processing elements under control of the sequence processor;
at the instances, applying the memory access rules for memory accesses by the plurality of processing elements, wherein the plurality of signals update the memory access rules dynamically as execution of the sequence of code progresses; and in the event of a memory access by a processing element violating one or more of the memory access rules, generating a warning signal.

2. The method according to claim 1, wherein the plurality of signals includes one or more signals indicating one or more memory addresses and the expected data contents at those one or more memory addresses.

3. The method according to claim 1, wherein the plurality of signals includes one or more signals indicating a particular memory address and a processing element which is expected to access the particular memory address.

4. The method according to claim 1, further comprising:
on generation of the warning signal, taking action to handle the consequences of the one or more rule violations.

5. The method according to claim 4, wherein the action comprises one or more of:
halting execution of part or all of the sequence of code;
outputting trace data of memory accesses prior to the violation; and
triggering an exception handling routine.

6. The method according to claim 1, wherein a violation is deemed to occur if a memory access by a processing element specifies a memory address to which access by the processing element is restricted.

7. The method according to claim 1, wherein a violation is deemed to occur if a memory access specifies a write action to a memory address which is read only.

8. The method according to claim 1, wherein a violation is deemed to occur if a memory access specifies a data value which differs from a value specified in one of the memory access rules.

9. The method according to claim 1, further comprising:
detecting memory accesses on one or more buses connected to the memory.

10. The method according to claim 1, wherein the plurality of signals indicating the plurality of memory access rules are generated by and received from the sequencer.

11. The method according to claim 1, carried out on trace data acquisition circuitry, provided for the purpose of debugging.

12. A hardware element for use in a multiprocessor system, the hardware element being adapted to perform a method in the multiprocessor system, wherein the method comprises:
receiving a plurality of signals during execution of a sequence of code, the plurality of signals indicating a plurality of memory access rules to be applied at instances during further execution of the sequence of code, wherein the multiprocessor system includes a plurality of processing elements, a sequencer, and memory to which each of the processing elements and the sequencer has access, wherein the sequencer is a sequence processor adapted to generate the sequence of code to be executed by the plurality of processing elements, wherein the sequencer is distinct from the plurality of processing elements, and wherein the generated sequence of code includes actions to be performed by the plurality of processing elements under control of the sequence processor;
at the instances, applying the memory access rules for memory accesses by the plurality of processing elements, wherein the plurality of signals update the memory access rules dynamically as execution of the sequence of code progresses; and
in the event of a memory access by a processing element violating one or more of the memory access rules, generating a warning signal.

13. The hardware element according to claim 12, wherein the plurality of signals indicating the plurality of memory access rules are generated by and received from the sequencer.

14. A multiprocessor system, comprising:
a plurality of processing elements;
a sequencer adapted to generate a sequence of code to be executed by the plurality of processing elements, wherein the sequencer is a sequence processor, wherein the sequencer is distinct from the plurality of processing elements, and wherein the generated sequence of code includes actions to be performed by the plurality of processing elements under control of the sequence processor;
memory to which each of the processing elements and the sequencer has access; and
a hardware element, wherein the hardware element is adapted to perform a method in the multiprocessor system and wherein the method comprises:
receiving a plurality of signals during execution of the sequence of code, the signals indicating a plurality of memory access rules to be applied at instances during further execution of the sequence of code;
at the instances, applying the memory access rules for memory accesses by the plurality of processing elements, wherein the plurality of signals update the memory access rules dynamically as execution of the sequence of code progresses; and
in the event of a memory access by a processing element violating one or more of the memory access rules, generating a warning signal.

15. The multiprocessor system according to claim 14, wherein the plurality of signals indicating the plurality of memory access rules are generated by and received from the sequencer.

* * * * *